US005650701A

United States Patent [19]
Shimizu et al.

[11] Patent Number: 5,650,701
[45] Date of Patent: Jul. 22, 1997

[54] ELECTRICALLY OPERATED POWER STEERING APPARATUS

[75] Inventors: Yasuo Shimizu; Mitsutaka Sugino, both of Saitama, Japan

[73] Assignee: Honda Giken Kogyo Kabushiki Kaisha, Tokyo, Japan

[21] Appl. No.: 746,192

[22] Filed: Nov. 6, 1996

Related U.S. Application Data

[63] Continuation of Ser. No. 358,168, Dec. 16, 1994, abandoned.

[30] Foreign Application Priority Data

Dec. 17, 1993 [JP] Japan ................... 5-317624

[51] Int. Cl.$^6$ ................................ B62D 5/04
[52] U.S. Cl. ............... 318/489; 318/14; 180/444; 74/388 PS
[58] Field of Search .................. 318/14, 15, 488, 318/489; 180/79.1, 148; 74/388 PS, 424.8 R

[56] References Cited

U.S. PATENT DOCUMENTS

| Re. 32,222 | 8/1986 | Drutchas | 180/79.1 |
| 4,666,014 | 5/1987 | Carlson et al. | 180/148 |
| 4,742,882 | 5/1988 | Shimizu et al. | 180/79.1 |
| 4,773,497 | 9/1988 | Carlson et al. | 318/616 X |
| 4,800,974 | 1/1989 | Wand et al. | 180/79.1 |
| 5,083,626 | 1/1992 | Abe et al. | 180/79.1 |

FOREIGN PATENT DOCUMENTS

| 0244556A2 | 11/1987 | European Pat. Off. . |
| 0279034A1 | 8/1988 | European Pat. Off. . |
| 0124418A2 | 11/1984 | France . |
| 59-50864 | 3/1984 | Japan . |
| 59-172072 | 11/1984 | Japan . |
| 2146300 | 4/1985 | United Kingdom . |

Primary Examiner—Bentsu Ro
Attorney, Agent, or Firm—Armstrong, Westerman Hattori, McLeland & Naughton

[57] ABSTRACT

An electrically operated power steering apparatus has a housing, a pinion rotatably supported in the housing, the pinion being adapted to be connected to a steering shaft, a rack shaft axially movably disposed in the housing and held in mesh with the pinion, an electric motor disposed coaxially around the rack in the housing, and a ball-and-nut mechanism disposed on the rack shaft in the housing for transmitting a torque produced by the electric motor as an axial displacement to the rack shaft. The electric motor has a stator fixedly mounted in the housing and a rotor rotatably supported in the housing by a pair of bearings mounted on respective opposite ends of the rotor. The ball-and-nut mechanism being coupled to the rotor. A rack guide is disposed in the housing behind the pinion remotely from the ball-and-nut mechanism and held in sliding contact with the rack shaft. The rack shaft is axially slidably supported in the housing by the ball-and-nut mechanism and the rack guide.

21 Claims, 6 Drawing Sheets

ELECTRICALLY OPERATED POWER STEERING APPARATUS

This application is a continuation of application Ser. No. 08/358,168 filed Dec. 16, 1994, now abandoned.

BACKGROUND OF THE INVENTION

1. Field of the Invention

The present invention relates to an electrically operated power steering apparatus for use on an automobile or the like.

2. Description of the Prior Art

There has been known an electrically operated power steering apparatus for assisting the driver of an automobile in turning a steering wheel when the rotation of the steering wheel is transmitted through a pinion to a rack shaft, which is horizontally displaced to cause tie rods coupled to the respective opposite ends of the rack shaft to turn steerable road wheels of the automobile. In the known electrically operated power steering apparatus, the steering torque of a steering shaft coupled to the steering wheel is detected and an electric motor is energized based on the detected steering torque. The rotational power of the electric motor is transmitted through a ball-and-nut mechanism to the rack shaft to assist in turning the road wheels. Such electrically operated power steering apparatus are disclosed in Japanese laid-open patent publication No. 59-50864 and Japanese laid-open utility model publication No. 59-172072.

In the electrically operated power steering apparatus disclosed in Japanese laid-open patent publication No. 59-50864, a ball-and-nut mechanism is positioned substantially centrally on a rack shaft, and the rack shaft is radially supported at five locations including bushings. It is difficult to keep the rack shaft in full coaxial alignment at all of the five supporting locations. Because of alignment errors of the rack shaft, different dimensional and assembling errors of the parts, and flexing displacements of the rack shaft caused by loads applied through tires and tie rods, the ball-and-nut mechanism and a rack-and-pinion mechanism are subject to undue forces tending to displace or deform them or tend to suffer undesirable friction. When this happens, the driver of the automobile has a bad steering feel, and the efficiency of the electric motor of the electrically operated power steering apparatus is lowered.

In the electrically operated power steering apparatus disclosed in Japanese laid-open utility model publication No. 59-172072, a rack shaft is radially supported at two locations, i.e., a ball-and-nut mechanism and a rack-and-pinion mechanism. Since the rack shaft radially supported at two positions is maintained in better coaxial alignment at those supporting positions, it is subjected to less undue forces. However, the rotor of an electric motor of the electrically operated power steering apparatus is supported in a cantilevered fashion due to its structural limitations. As a result, the distal end of the rotor is liable to interfere with an iron core which is fixed to a rack housing.

SUMMARY OF THE INVENTION

It is therefore an object of the present invention to provide an electrically operated power steering apparatus which has a rack shaft axially slidably supported in a manner to reduce displacing or deforming forces and friction on a ball-and-nut mechanism and a rack-and-pinion mechanism, and an electric motor including a rotor supported in position with high rigidity.

According to the present invention, there is provided an electrically operated power steering apparatus comprising a housing, a pinion rotatably supported in the housing, the pinion being adapted to be connected to a steering shaft, a rack shaft axially movably disposed in the housing and held in mesh with the pinion, an electric motor disposed coaxially around the rack in the housing, a ball-and-nut mechanism disposed on the rack shaft in the housing for transmitting a torque produced by the electric motor as an axial displacement to the rack shaft, the electric motor comprising a stator fixedly mounted in the housing and a rotor rotatably supported in the housing by a pair of bearings mounted on respective opposite ends of the rotor, the ball-and-nut mechanism being coupled to the rotor, and a rack guide disposed in the housing behind the pinion remotely from the ball-and-nut mechanism and held in sliding contact with the rack shaft, whereby the rack shaft is axially slidably supported in the housing by the ball-and-nut mechanism and the rack guide.

One of the bearings may comprise a bearing for preventing the rotor from moving axially, and the other of the bearings may comprise a bearing for, allowing the rotor to move axially. Alternatively, one of the bearings may be positioned near the pinion and comprise a bearing for preventing the rotor from moving axially, and the other of the bearings may be positioned remotely from the pinion and comprise a needle bearing for allowing the rotor to move axially.

The ball-and-nut mechanism may have at least a portion disposed in axially overlapping relation to one of the bearings which is positioned near the pinion.

The ball-and-nut mechanism may have screw threads defined on an outer circumferential surface of the rack shaft from an end thereof.

The ball-and-nut mechanism may have a nut supported by one of the bearings which is positioned near the pinion, the nut being integral with the rotor.

The ball-and-nut mechanism may have a nut supported by one of the bearings which is positioned near the pinion, the nut being separate from and joined to the rotor.

The housing may comprise a block as a casting and a pipe connected to the block, the rack shaft extending through the block and the pipe. The pipe may have an end inserted in the block, the bearings being positioned in the pipe. Alternatively, the pipe may have an end joined to the block by staking, one of the bearings being supported in the block.

According to the present invention, there is also provided an electrically operated power steering apparatus comprising a housing having axially opposite ends, a pinion rotatably supported in one of the axially opposite ends of the housing, the pinion being adapted to be connected to a steering shaft, a rack shaft axially movably disposed in the housing and held in mesh with the pinion, an electric motor disposed coaxially around the rack in the housing, a ball-and-nut mechanism disposed on the rack shaft in the other of the axially opposite ends of the housing and coupled to the electric motor for axially displacing the rack shaft in response to a torque produced by the electric motor, and a rack guide disposed in the housing in the one of the axially opposite ends of the rack shaft and held in sliding contact with the rack shaft. The electric motor may comprise a stator fixedly mounted in the housing and a tubular rotor rotatably supported around the rack in the housing by a pair of bearings mounted on respective opposite ends of the rotor, the ball-and-nut mechanism being coupled to the rotor.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
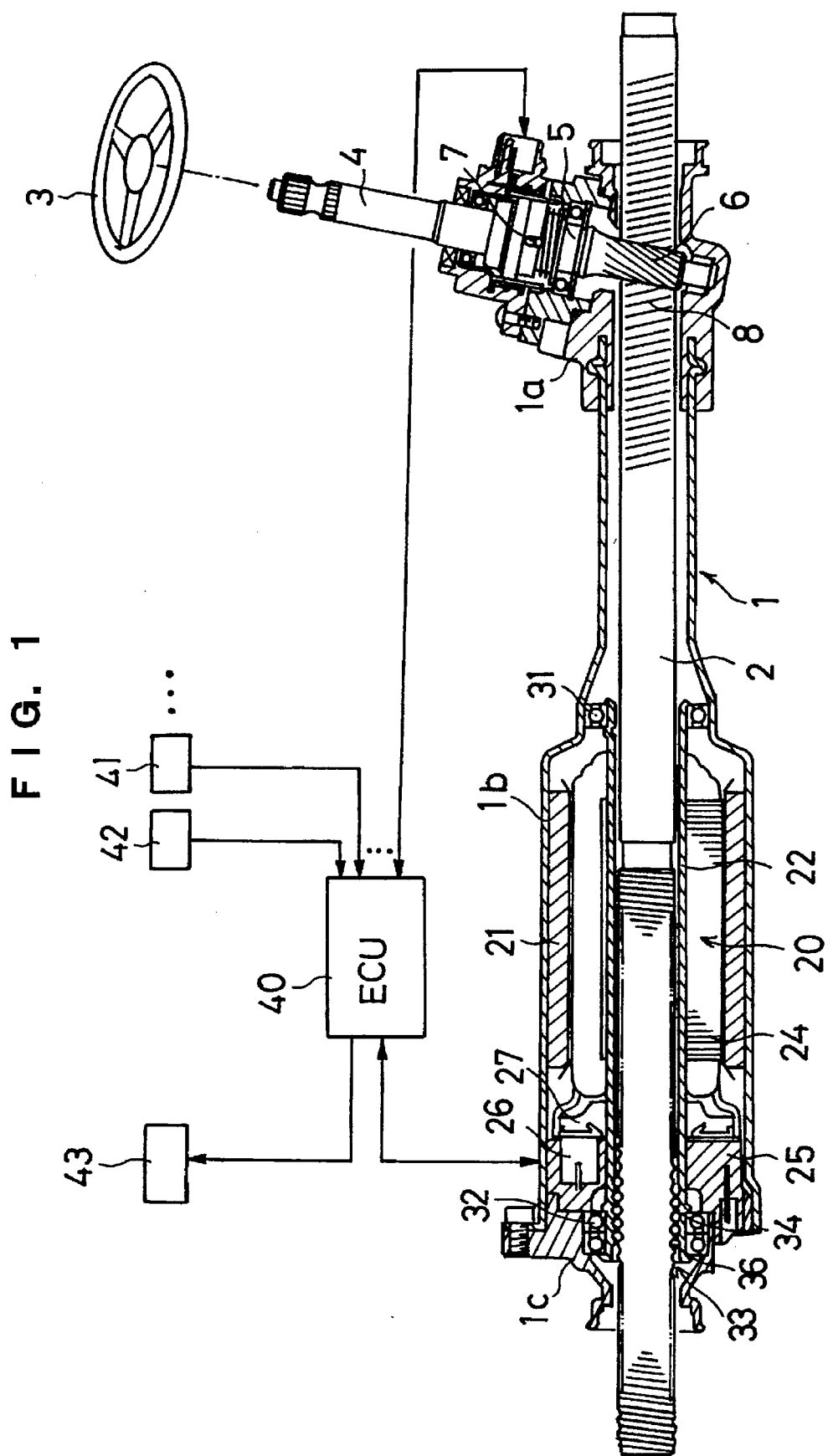
FIG. 1 is a cross-sectional view of an electrically operated power steering apparatus according to an embodiment of the present invention.

As shown in FIG. 1, an electrically operated power steering apparatus according to an embodiment of the present invention has an elongate cylindrical housing 1 composed of a block 1a in the form of a casting and a pipe 1b having an end inserted in the block 1a. The end of the pipe 1b can be inserted in the block 1b when it is placed in a die for casting the block 1b and the block 1b is cast in the die.

The electrically operated power steering apparatus also has a rack shaft 2 inserted in the housing 1 and having axially opposite ends projecting from respective axially opposite ends of the housing 1 and coupled to respective tie rods (not shown) which are connected to respective road wheels of an automobile. When the rack shaft 2 is axially moved horizontally, it causes the tie rods to turn the road wheels to steer the automobile.

Figure 2:
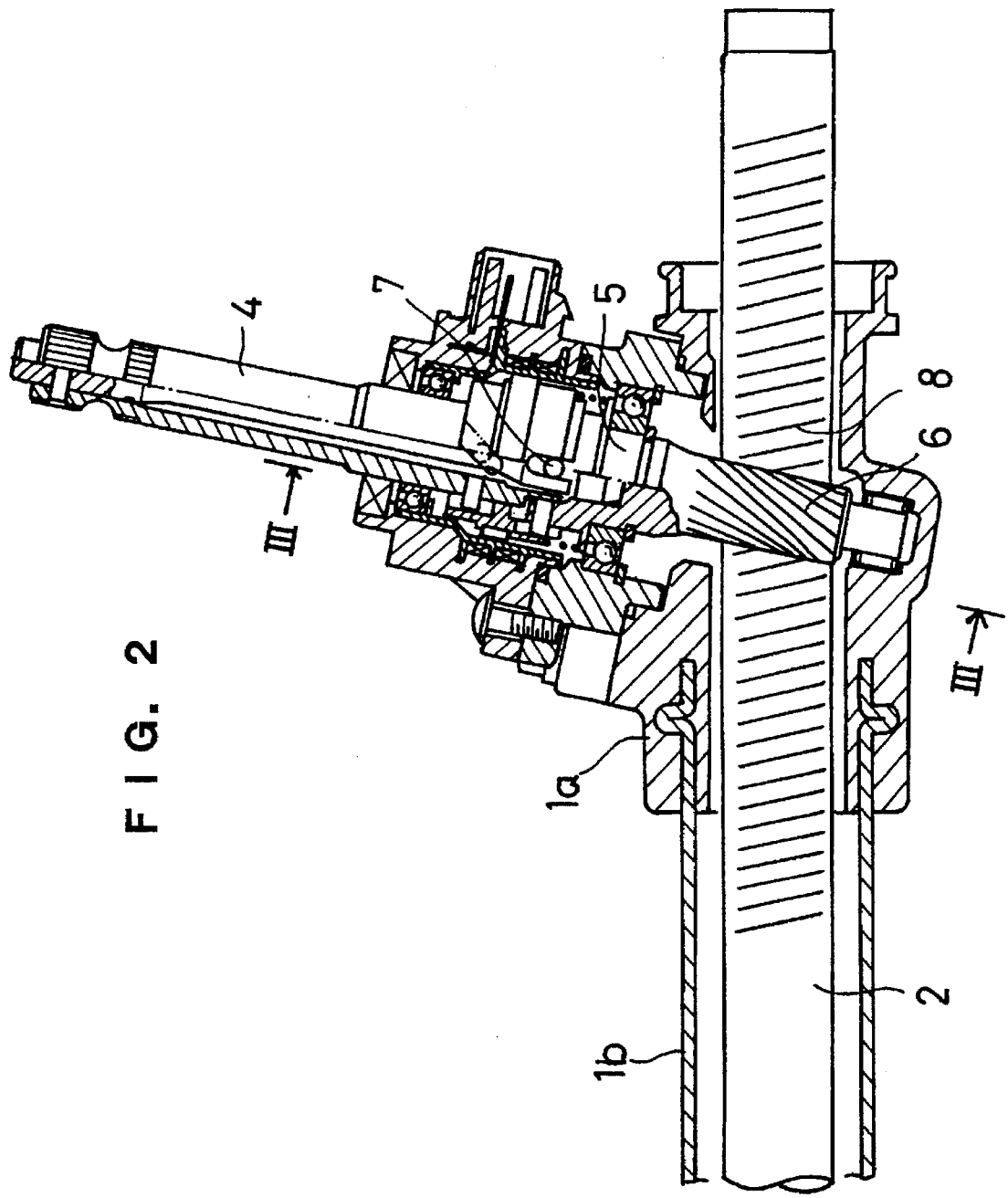
FIG. 2 is an enlarged cross-sectional view of a rack-and-pinion mechanism of the electrically operated power steering apparatus shown in FIG. 1.

As shown in FIGS. 1 and 2, a steering shaft 4 rotatable about its own axis by a steering wheel 3 coupled to an upper end thereof has a lower end portion inserted in the block 1bat one end of the housing 1. In the block 1a, the lower end of the steering shaft 4 is connected through a torsion bar to an output shaft 5 which is coaxially joined to a pinion 6 that is disposed therebelow and rotatably supported in the block 1a. A steering torque detecting mechanism 7 is disposed between the steering shaft 4 and the output shaft 5. The pinion 6 is held in mesh with a rack 8 that is formed on a side of the rack shaft 2 in the housing 1. The rack 8 on the rack shaft 2 and the pinion 6 Jointly serve as a rack-and-pinion mechanism.

Figure 3:
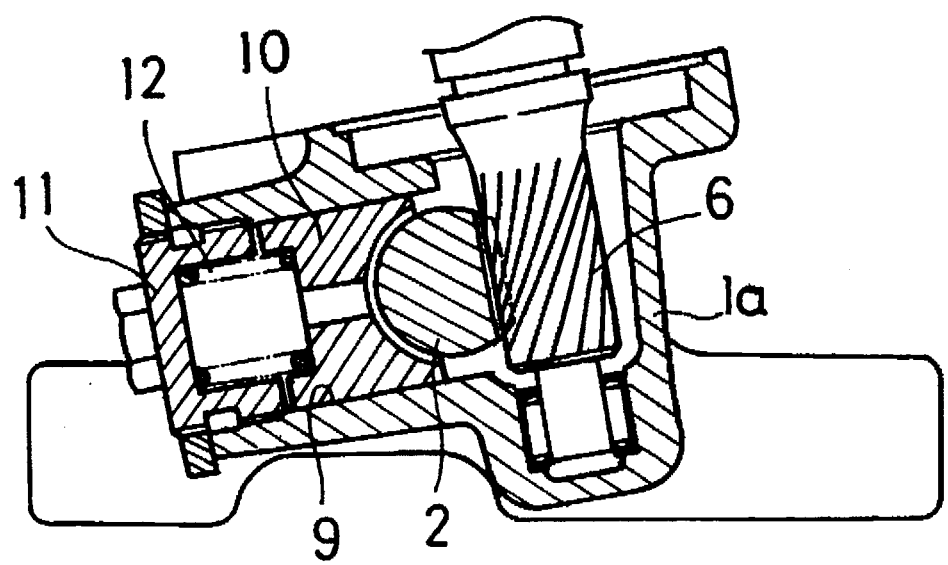
FIG. 3 is a fragmentary cross-sectional view taken along line III—III of FIG. 2.

As shown in FIG. 3, the block 1a has a cylinder 9 positioned laterally of the pinion 6, and a rack guide 10 is slidably disposed in the cylinder 9 in sliding contact with the rack shaft 2 behind the pinion 6. The cylinder 9 has an open end remote from the rack 2 and closed by a cap 11. The rack guide 10 is normally biased by a spring 12 disposed under compression between the rack guide 10 and the cap 11 in a direction to press the rack shaft 2 against the pinion 6. The rack shaft 2 is thus slidably supported by the rack guide 10.

As shown in FIG. 1, the pipe 1b of the housing 1 has a larger-diameter portion remote from the rack-and-pinion mechanism, and an electric motor 20 is housed in the larger-diameter portion of the pipe 1b.

Figure 4:
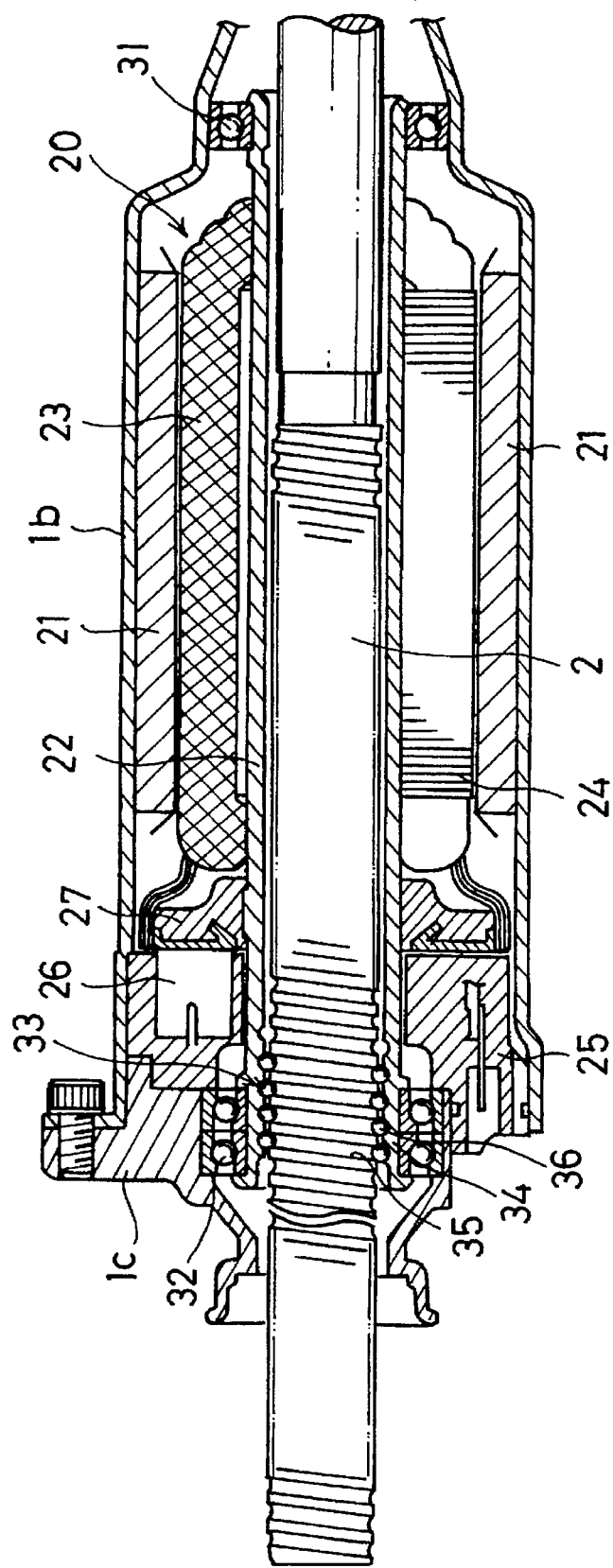
FIG. 4 is an enlarged cross-sectional view of an electric motor of the electrically operated power steering apparatus shown in FIG. 1.

As illustrated in FIG. 4, the electric motor 20 comprises a stator (magnet) 21 fixedly mounted on an inner circumferential surface of the larger-diameter portion of the pipe 1b, and a tubular rotor 22 disposed around the rack shaft 2 with a certain space defined therebetween in the larger-diameter portion of the pipe 1b. The electric motor 20 also has an iron core 24 fixedly mounted on an outer circumferential surface of the tubular rotor 22, and coils 23 wound on the iron core 24. The coils 23 and the iron core 24 are spaced radially inwardly from the stator 21 by a small radial gap therebetween.

The pipe 1b has an axial end opening closed by a cap 1c remotely from the rack-and-pinion mechanism. A brush holder 25 is fixedly supported by the cap 1c in the larger-diameter portion of the pipe 1b. The coils 23 are supplied with an electric current through a brush 26 held by,the brush holder 25 and a commutator 27 connected to the coils 23 and slidably held against the brush 26.

The tubular rotor 22 has axially opposite ends rotatably supported in the housing 1 by respective ball bearings 31, 32. The ball bearing 31, which is positioned remotely from the cap 1c, comprises a radial bearing for allowing the tubular rotor 22 to move axially. The ball bearing 32, which is supported in the cap 1c, comprises an angular-type bearing for preventing the tubular rotor 22 from moving axially. The ball bearings 31, 32 allow various parts to be assembled accurately and simply even if the parts have low dimensional accuracy.

A ball-and-nut mechanism 33 is disposed in the end of the tubular rotor 22 which is positioned radially inwardly of the ball bearing 32. The ball-and-nut mechanism 33 comprises a nut 34 integral with the end of the tubular rotor 22 which is supported by the ball bearing 32, screw threads 35 defined in an end portion of the outer circumferential surface of the rack shaft 2, and a plurality of steel balls 36 held between the nut 34 and the screw threads 35.

The ball bearing 32 and the ball-and-nut mechanism 33 are thus positioned in axially overlapping relation to each other. Since the ball-and-nut mechanism 33 is supported at its back or outer circumferential region thereof by the ball bearing 32, the ball-and-nut mechanism 33 can effectively transmit a torque produced by the electric motor 20. Furthermore, because the screw threads 35 are defined in an end portion of the outer circumferential surface of the rack shaft 2, the screw threads 35 can easily be formed by rolling on the rack shaft 2 from its end. The screw threads 35 thus formed have an increased mechanical strength.

As shown in FIG. 1, the electrically operated power steering apparatus also includes an electronic control unit (ECU) 40 electrically connected to the steering torque detecting mechanism 7 and the electric motor 20, a vehicle speed sensor 41 electrically connected to the ECU 40, a key switch 42 electrically connected to the ECU 40, and a warning lamp 43 electrically connected to the ECU 40. Other sensors including a motor current sensor, a steering angle sensor, etc. are also electrically connected to the ECU 40.

When signals are supplied from the steering torque detecting mechanism 7, the vehicle speed sensor 41, the key switch 42, and other sensors to the ECU 40, the ECU 40 effects predetermined arithmetic operations to produce a control signal to supply an electric current to the electric motor 20. Based on the determined control signal, a motor driver (not shown) connected to a power supply energizes the electric motor 20. When the electric motor 20 is energized, the rotor 22 is rotated to cause the ball-and-nut mechanism 33 to move the rack shaft 2 axially for thereby moving the tie rods. Accordingly, the driver is assisted in steering the automobile.

In the electrically operated power steering apparatus shown in FIGS. 1 through 4, the rack shaft 2 is supported at two axially spaced locations, i.e., by the ball-and-nut mechanism 33 and the rack guide 10. Therefore, the rack shaft 2 is kept in better coaxial alignment and subjected to less undue forces tending to displace or deform the rack-and-pinion mechanism and the ball-and-screw mechanism 33 or cause them to suffer undesirable friction. Furthermore, the tubular rotor 22 is supported with high rigidity as its axially opposite ends are supported.

Figure 5:
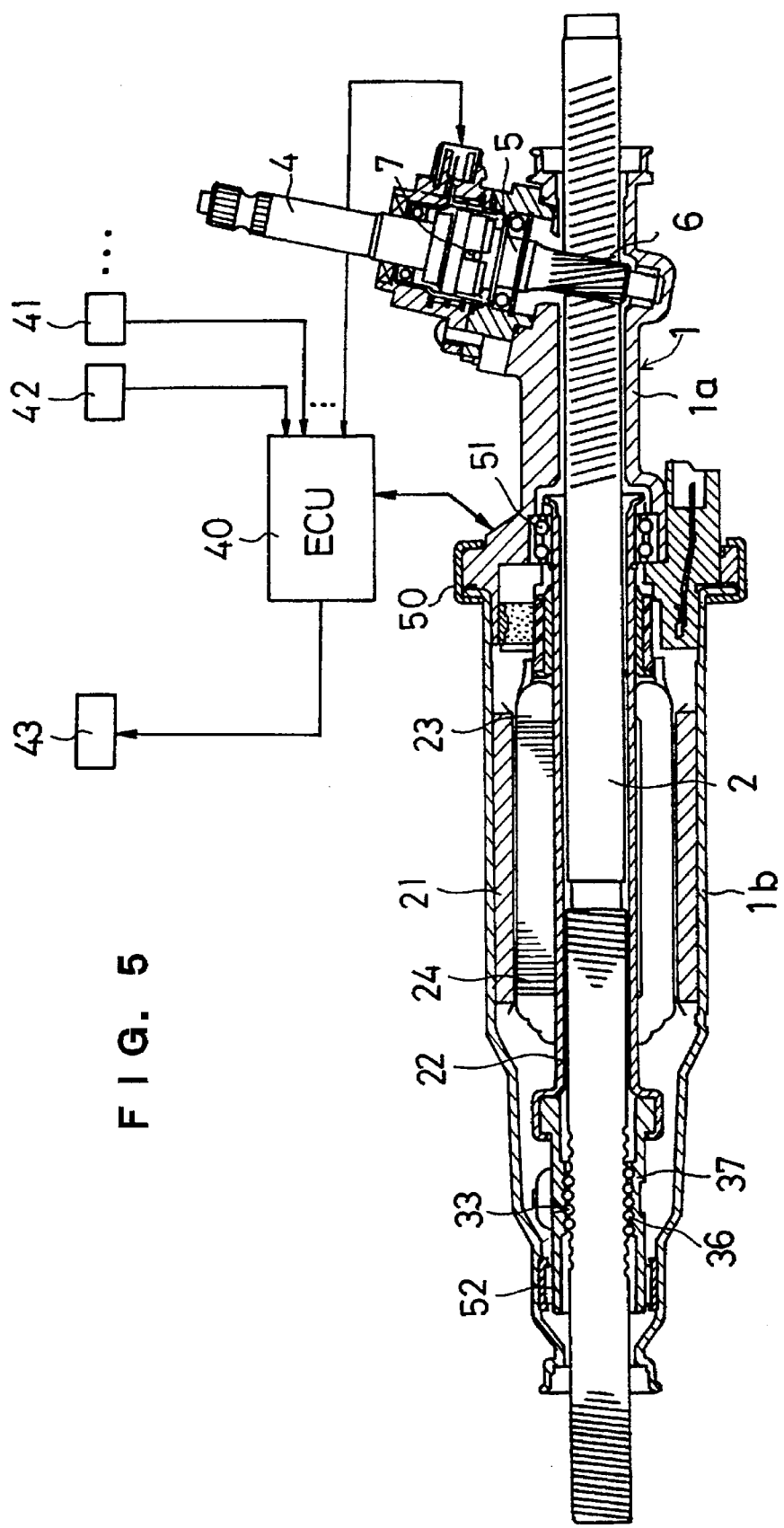
FIG. 5 is a cross-sectional view of an electrically operated power steering apparatus according to another embodiment of the present invention.
Figure 6:
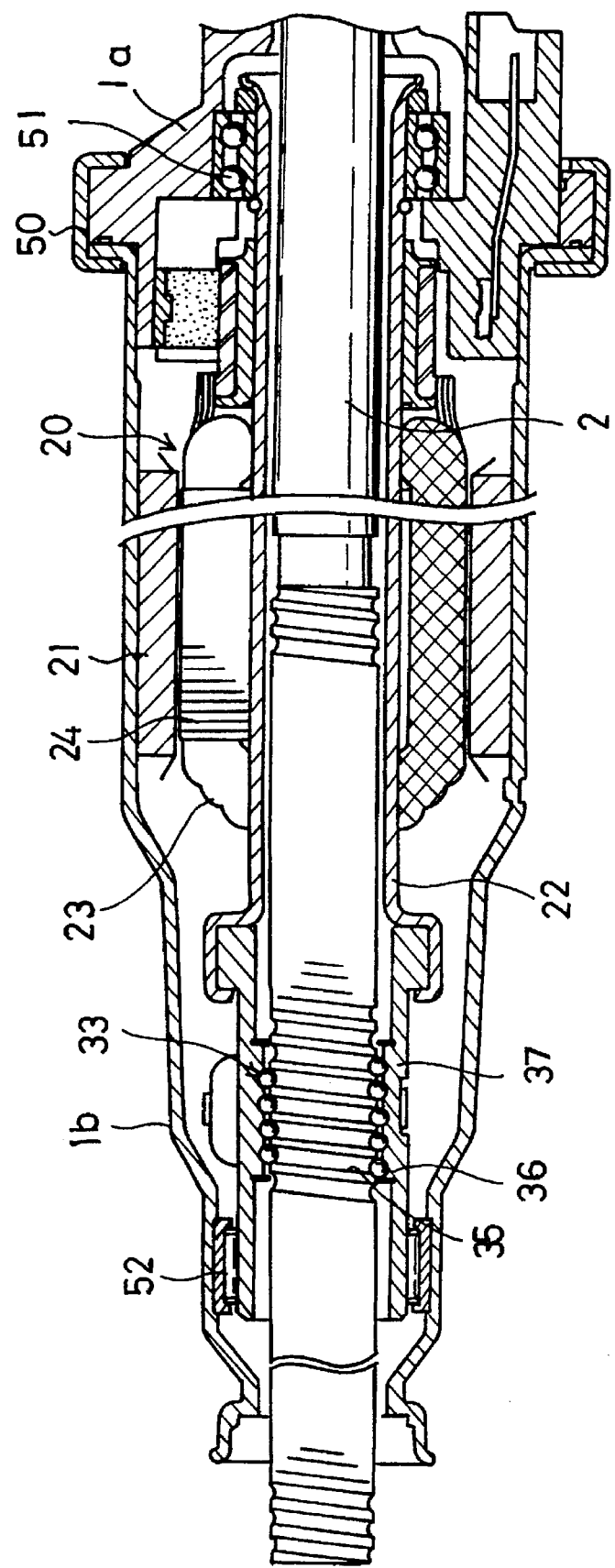
FIG. 6 is an enlarged cross-sectional view of an electric motor of the electrically operated power steering apparatus shown in FIG. 5.

FIGS. 5 and 6 show an electrically operated power steering apparatus according to another embodiment of the present invention. Those parts shown in FIGS. 5 and 6 which are identical to those shown in FIGS. 1 through 4 are denoted by identical reference numerals, and will not be described in detail below.

As shown in FIGS. 5 and 6, a housing i has a block 1a in the form of a casting and a pipe 1b which has an end joined to the block 1a by an annular joint 50 which is staked by rolling. The block 1a and the pipe 1b are thus securely coupled to each other into a highly integral structure.

An electric motor 22 includes a tubular rotor 22 which is rotatably supported in the pipe 1b by bearings 51, 52. The bearing 51 is supported by the block 1band comprises an angular-type ball bearing for preventing the tubular rotor 22 from moving axially. The bearing 52, which is positioned remotely from the block 1a, is supported in the pipe 1b near a distal end thereof, and comprises a needle bearing for allowing the tubular rotor 22 to move axially. The needle bearing 52 permits the end of the housing 1, i.e., the pipe 1b, to be reduced in diameter.

A ball-and-nut mechanism 33 is separate from and joined to the tubular rotor 22. Specifically, the ball-and-nut mechanism 33 comprises a nut 37 disposed around the rack shaft 2 and having an end joined to an end of the tubular rotor 22 by staking, screw threads 35 defined in an end portion of the outer circumferential surface of the rack shaft 2, and a plurality of steel balls 36 held between the nut 37 and the screw threads 35. The nut 37 has an opposite end supported by the needle bearing 52.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

What is claimed is:

1. An electrically operated power steering apparatus, comprising
    a housing;
    a pinion rotatably supported in said housing, said pinion being adapted to be connected to a steering shaft;
    a rack shaft axially movably disposed in said housing and held in mesh with said pinion;
    an electric motor disposed coaxially around said rack shaft in said housing;
    a ball-and-nut mechanism disposed on said rack shaft in said housing for transmitting a torque produced by said electric motor as an axial displacement to said rack shaft, wherein said electric motor comprises a stator fixedly mounted in said housing and a rotor rotatably supported in said housing by a pair of bearings mounted on respective opposite ends of said rotor, said ball-and-nut mechanism being coupled to said rotor; and
    a rack guide disposed in said housing behind said pinion remotely from said ball-and-nut mechanism and held in sliding contact with said rack shaft, wherein said rack shaft is axially slidably supported in said housing at two locations by said ball-and-nut mechanism and said rack guide, said rack guide being biased against said rack shaft to press said rack shaft against said pinion.

2. An electrically operated power steering apparatus according to claim 1, wherein one of said bearings comprises a bearing for preventing said rotor from moving axially, and the other of said bearings comprises a bearing for allowing said rotor to move axially.

3. An electrically operated power steering apparatus according to claim 1, wherein one of said bearings is positioned near said pinion and comprises a bearing for preventing said rotor from moving axially, and the other of said bearings is positioned remotely from said pinion and comprises a needle bearing for allowing said rotor to move axially.

4. An electrically operated power steering apparatus according to claim 1, wherein said ball-and-nut mechanism has at least a portion disposed in axially overlapping relation to one of said bearings which is positioned near said pinion.

5. An electrically operated power steering apparatus according to claim 1, wherein said ball-and-nut mechanism has screw threads defined on an outer circumferential surface of said rack shaft from an end thereof.

6. An electrically operated power steering apparatus according to claim 1, wherein said ball-and-nut mechanism has a nut supported by one of said bearings which is positioned near said pinion, said nut being integral with said rotor.

7. An electrically operated power steering apparatus according to claim 1, wherein said ball-and-nut mechanism has a nut supported by one of said bearings which is positioned near said pinion, said nut being separate from and joined to said rotor.

8. An electrically operated power steering apparatus according to claim 1, wherein said housing comprises a block as a casting and a pipe connected to said block, said rack shaft extending through said block and said pipe.

9. An electrically operated power steering apparatus according to claim 8, wherein said pipe has an end inserted in said block, said bearings being positioned in said pipe.

10. An electrically operated power steering apparatus according to claim 8, wherein said pipe has an end joined to said block by staking, one of said bearings being supported in said block.

11. An electrically operated power steering apparatus, comprising:
    a housing having axially opposite ends;
    a pinion rotatably supported in one of said axially opposite ends of said housing, said pinion being adapted to be connected to a steering shaft;
    a rack shaft axially movably disposed in said housing and held in mesh with said pinion;
    an electric motor disposed coaxially around said rack shaft in said housing;
    a ball-and-nut mechanism disposed on said rack shaft in the other of said axially opposite ends of said housing and coupled to said electric motor for axially displacing said rack shaft in response to a torque produced by said electric motor; and a rack guide disposed in said housing in said one of the axially opposite ends and held in sliding contact with said rack shaft, wherein said rack shaft is axially slidably supported in said housing at two locations by said ball-and-nut mechanism and said rack guide, said rack guide being biased against said rack shaft to press said rack shaft against said pinion.

12. An electrically operated power steering apparatus according to claim 11, wherein said electric motor comprises a stator fixedly mounted in said housing and a tubular rotor rotatably supported around said rack shaft in said housing by a pair of bearings mounted on respective opposite ends of said rotor, said ball-and-nut mechanism being coupled to said rotor.

13. An electrically operated power steering apparatus according to claim 12, wherein one of said bearings comprises a bearing for preventing said tubular rotor from moving axially, and the other of said bearings comprises a bearing for allowing said tubular rotor to move axially.

14. An electrically operated power steering apparatus according to claim 12, wherein one of said bearings is positioned near said pinion and comprises a bearing for preventing said tubular rotor from moving axially, and the other of said bearings is positioned remotely from said pinion and comprises a needle bearing for allowing said tubular rotor to move axially.

15. An electrically operated power steering apparatus according to claim 12, wherein said ball-and-nut mechanism has a nut supported by one of said bearings which is positioned near said pinion, said nut being integral with said tubular rotor.

16. An electrically operated power steering apparatus according to claim 12, wherein said ball-and-nut mechanism has a nut supported by one of said bearings which is positioned near said pinion, said nut being separate from and joined to said tubular rotor.

17. An electrically operated power steering apparatus according to claim 12, wherein said ball-and-nut mechanism has at least a portion disposed in axially overlapping relation to one of said bearings which is positioned near said pinion.

18. An electrically operated power steering apparatus according to claim 12, wherein said housing comprises a block as a casting and a pipe connected to said block, said rack shaft extending through said block and said pipe.

19. An electrically operated power steering apparatus according to claim 18, wherein said pipe has an end inserted in said block, said bearings being positioned in said pipe.

20. An electrically operated power steering apparatus according to claim 18, wherein said pipe has an end joined to said block by staking, one of said bearings being supported in said block.

21. An electrically operated power steering apparatus according to claim 11, wherein said ball-and-nut mechanism has screw threads defined on an outer circumferential surface of said rack shaft from an end thereof.

* * * * *